United States Patent
Yoshikawa

[11] Patent Number: 5,243,404
[45] Date of Patent: Sep. 7, 1993

[54] FOURIER TRANSFORM SPECTROPHOTOMETER

[75] Inventor: Osamu Yoshikawa, Ukyo, Japan

[73] Assignee: Shimadzu Corporation, Kyoto, Japan

[21] Appl. No.: 675,180

[22] Filed: Mar. 26, 1991

[30] Foreign Application Priority Data

Sep. 29, 1990 [JP] Japan .................................. 2-261576
Nov. 30, 1990 [JP] Japan .................................. 2-339548

[51] Int. Cl.⁵ .................................................. G01B 9/02
[52] U.S. Cl. .................................................. 356/346
[58] Field of Search ............................... 356/345, 346

[56] References Cited

U.S. PATENT DOCUMENTS 4,681,445  7/1987  Perkins ................................. 356/346

FOREIGN PATENT DOCUMENTS 3005520  8/1981  Fed. Rep. of Germany ...... 356/346
3736694  6/1989  Fed. Rep. of Germany .

Primary Examiner—Samuel A. Turner
Attorney, Agent, or Firm—William L. Klima

[57] ABSTRACT

Two corner cubes are opposed to share one or two mirror surfaces in common thereby integrally forming two mirror groups, and driven to be reciprocatively rotated in a plane including two opposite edges thereof or a symmetry plane including an edge defined by the two common mirror surfaces, while a beam splitter is provided in front of the two corner cubes for reflecting a part of incident light and guiding the same to one of the corner cubes as well as transmitting the remaining part of the incident light and guiding the same to the other one of the corner cubes while causing interference between light components reflected from the corner cubes. According to the present invention, a moving mechanism may simply cause reciprocative rotation movement about one center of rotation, and adjustment in assembling is extremely simple and easy to allow reduction in manufacturing cost. A double corner cube member, which can be formed of the same material, is stable against disturbance such as vibration and temperature change. When plane mirrors for forming the corner cubes are manufactured by machining such as cutting or grinding, it is possible to perform assembling and working in high accuracy.

28 Claims, 5 Drawing Sheets

FOURIER TRANSFORM SPECTROPHOTOMETER

BACKGROUND OF THE INVENTION

1. Field of the Invention

The present invention relates to a two-beam interferometer, which is applied to a Fourier transform infrared spectrophotometer (FTIR) or the like.

2. Description of the Background Art

A Michelson interferometer, which is formed by two plane mirrors and a beam splitter, is employed as a two-beam interferometer for a Fourier transform infrared spectrophotometer. One of the two plane mirrors is a fixed mirror, and the other one is a moving mirror, which is continuously slidable.

Such a two-beam interferometer is particularly sensitive to change in environmental temperature, vibration, and the like. To this end, a dynamic alignment method utilizing a laser beam is employed as one of means for stabilizing interference conditions. However, the dynamic alignment method tends to disadvantageously complicate an apparatus employed therefor.

In another method, a corner cube is employed in place of a mirror, as an optical system which is resistant against vibration. In a conventional two-beam interferometer, a moving mirror for a Michelson interferometer is formed by a corner cube, which is supported by a mechanical bearing and slid in the horizontal direction.

In another conventional two-beam interferometer, two corner cubes are mounted on metal support rods respectively to be obliquely opposite to each other in a plane, and reciprocatively rotated in the plane in the opposite state.

In the aforementioned two-beam interferometer using the mechanical bearing, the summits of the corner cube are varied with respect to an optical axis of incident light, to inevitably cause discrepancy of interference conditions.

In the system of rotating the two corner cubes in an opposite state, on the other hand, discrepancy of interference conditions is inevitably caused by assembling conditions for the moving portions.

SUMMARY OF THE INVENTION

An object of the present invention is to provide a two-beam interferometer which is stable against temperature change and disturbance such as vibration, by simplifying adjustment in assembling of an interferometer comprising two opposite corner cubes.

According to the present invention, two corner cubes are integrally formed to be obliquely opposite to each other and to share one mirror surface as a common plane, and the integrated two corner cubes are driven to be reciprocatively rotated while unidirectionally maintaining a plane including opposite edges of the corner cubes.

In another aspect of the present invention, two corner cubes are integrally formed to be obliquely opposite to each other and to share two mirror surfaces as common planes, and the integrated two corner cubes are driven to be reciprocatively rotated while unidirectionally maintaining a symmetry plane including an edge which is defined by the two common mirror surfaces.

In order to form the inventive two-beam interferometer, a beam splitter is provided in front of the two corner cubes, to reflect a part of incident light and guide the same to one of the corner cubes as well as to transmit the remaining part of the incident light and guide the same to the other corner cube, while causing interference between light components reflected from the two corner cubes.

In order to improve assembling accuracy, the two corner cubes may be manufactured by machining such as cutting or grinding.

When the two corner cubes are rotated in the plane including the opposite edges or the symmetry plane including the edge which is defined by the common two mirror surfaces, optical path difference between two arms of the interferometer is changed. The two corner cubes are continuously reciprocatively rotated, to implement a continuous sliding type two-beam interferometer.

Even if the incident light upon the beam splitter is shifted by disturbance such as vibration, the light components reflected from the two corner cubes interfere with each other through the beam splitter.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
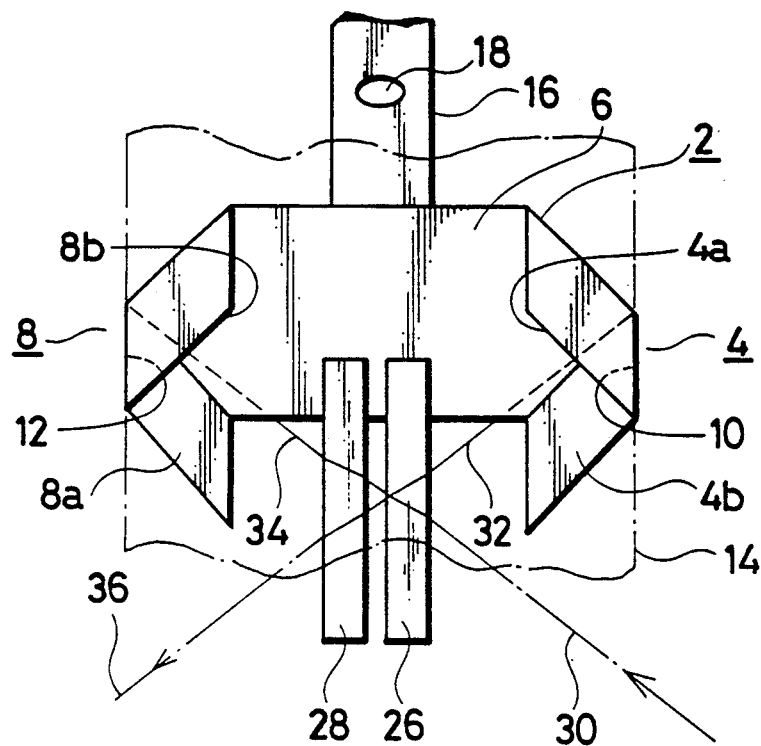
FIG. 1 is a perspective view showing an essential part of a first embodiment of the present invention.

FIGS. 1 to 4 illustrate a first embodiment of the inventive two-beam interferometer, which employs a double corner cube member 2, dissimilarly to an ordinary Michelson interferometer.

The double corner cube member 2 is assembled by bonding or screwing five cut plane mirrors in all. A first corner cube 4 is formed by plane mirrors 4a, 4b and 6, and a second corner cube 8 is formed by plane mirrors 8a, 8b and 6. The plane mirror 6 is common to the first and second corner cubes 4 and 8.

Adjacent surfaces of the corner cubes 4 and 8 are at right angles to each other, and an error in assembling accuracy from the right angle is within a range of about 2 to 5 seconds (angle). According to the existing technique, it is easy to work the mirrors in such high accuracy.

An edge 10 which is defined by the two mirror surfaces 4a and 4b of the first corner cube 4 and an edge 12 which is defined by the two mirror surfaces 8a and 8b of the second corner cube 8 are parallel to each other, while an end of a connecting rod 16 is screwed on a back surface of the mirror surface 6, which is common to the two corner cubes 4 and 8, in a plane 14 including the two edges 10 and 12. A rotary bearing 18 is embedded in the connecting rod 16 to be rotatable in the plane 14 (horizontal plane in this embodiment) including the two edges 10 and 12, whereby the two corner cubes 4 and 8 can be freely rotated while maintaining the plane 14 at the same position.

Figure 2:
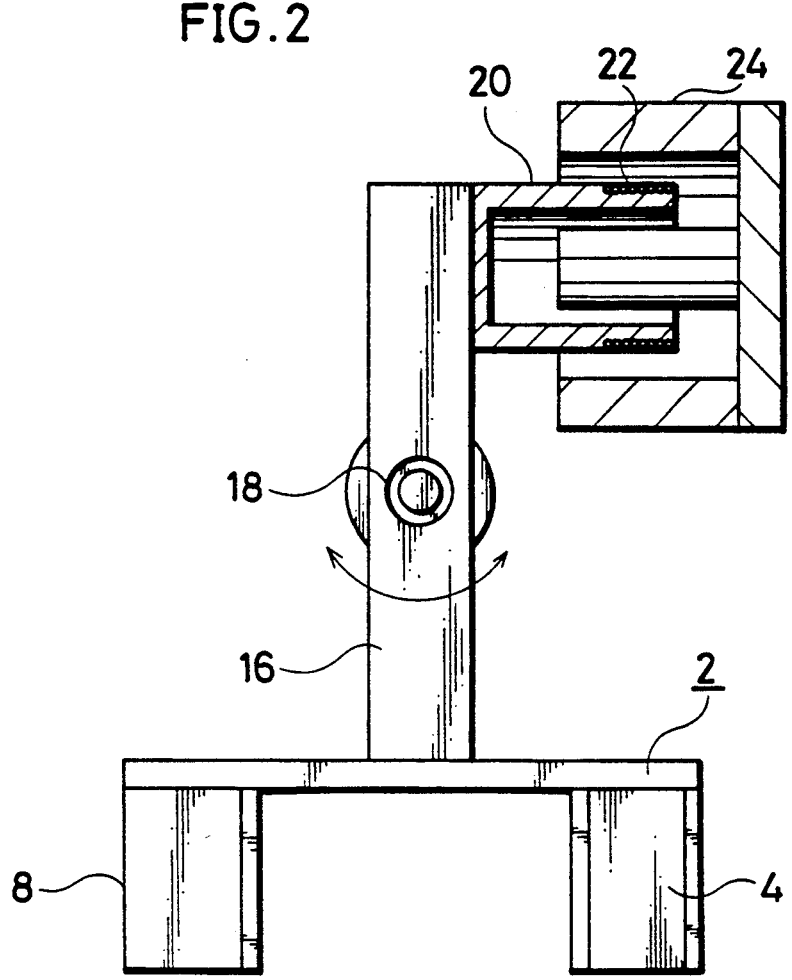
FIG. 2 is a partially fragmented plan view showing mirrors and a driving mechanism of the first embodiment.
Figure 4:
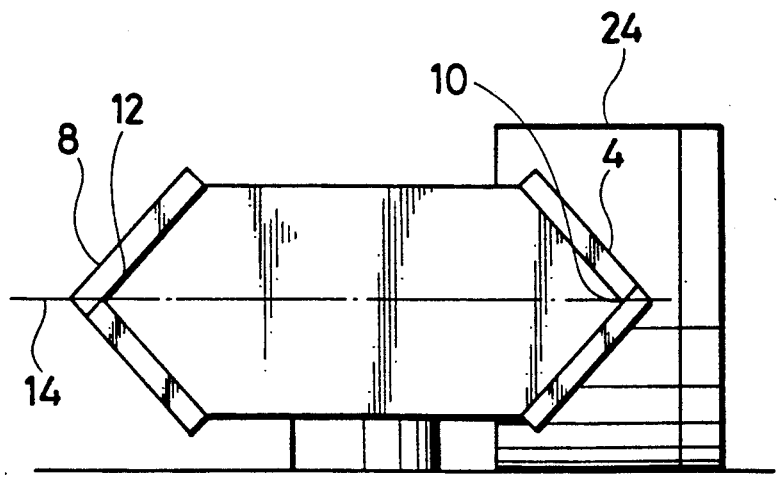
FIG. 4 is a front elevational view of the part shown in FIG. 2.

A movable portion 20 of a linear motor is screwed on the other end of the connecting rod 16, and a coil 22 is wound on the movable portion 20. This movable portion 20 is combined with a stator 24 of the linear motor. A current is fed to the coil 22 to cause Lorentz's force between the stator 24 and the movable portion 20, whereby the movable portion 20 is reciprocated in a limited range. This reciprocation rotates the connecting rod 16 about the rotary bearing 18 in a reciprocative manner, as shown in FIG. 2 by an arrow.

As shown in FIG. 1, a beam splitter 26 and a compensator 28 are provided in front of a central portion of the double corner cube member 2, in order to form an interferometer. A part 32 of an incident ray 30 is reflected by the beam splitter 26 to be incident upon the first corner cube 4, and reflected by the first corner cube 4 to be again incident upon the beam splitter 26. In the incident ray 30, a ray 34 transmitted through the beam splitter 26 is incident upon the second corner cube 8, and reflected by the second corner cube 8 to be again incident upon the beam splitter 26. The rays reflected from the corner cubes 4 and 8 form interferent light 36, and guided to a sample chamber.

The operation of this embodiment is now described.

Figure 5:
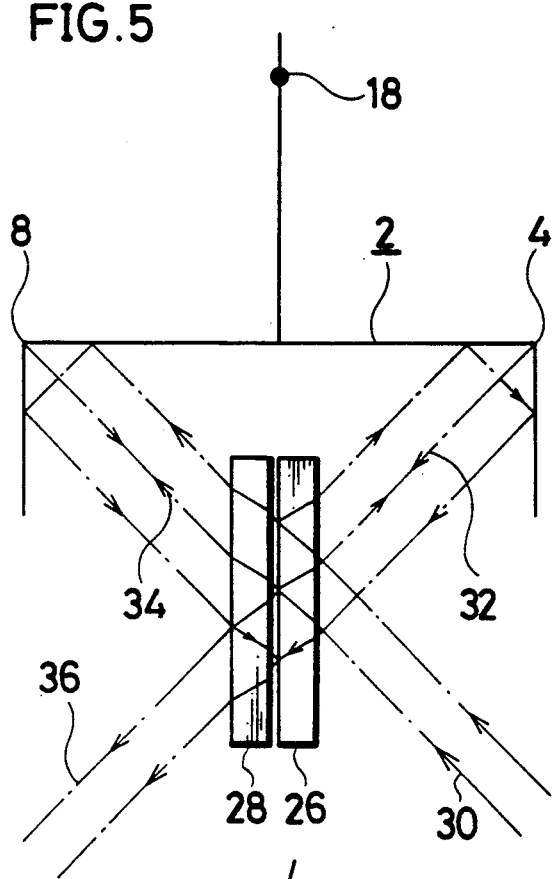
FIGS. 5 and 6 schematically illustrate the operation of the first embodiment.
Figure 6:
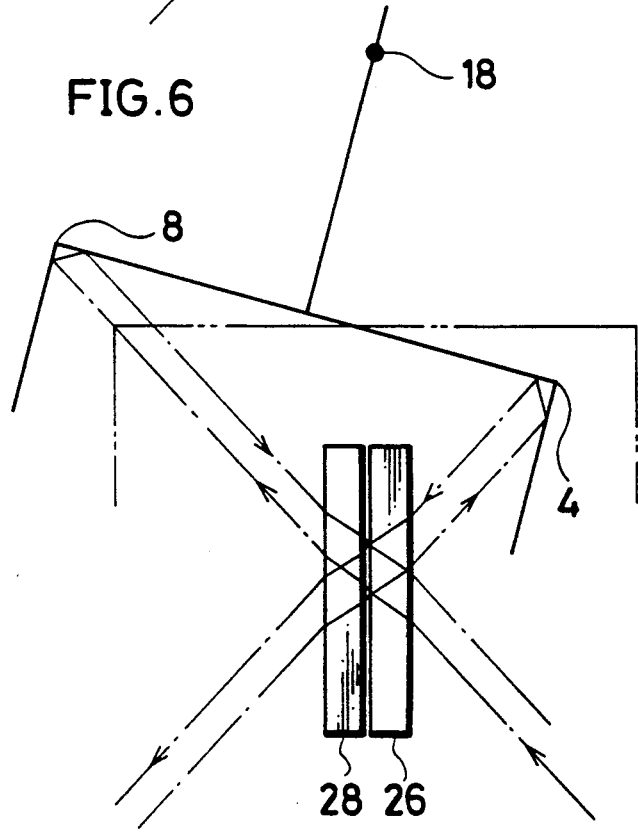

FIG. 5 shows such a state that no optical path difference is caused between two arms of the interferometer. On the other hand, FIG. 6 shows such a state that the double corner cube member 2 (corner cubes 4 and 8) is rotated about the rotary bearing 18, to cause optical path difference between the two arms. Due to such reciprocative rotation movement about the rotary bearing 18, a continuous sliding type two-beam interferometer is defined. FIGS. 5 and 6 are two-dimensional model diagrams.

FIG. 5 also shows shifting of the incident ray 30 which is caused by disturbance such as vibration. Also in this case, interferent light can be stably obtained by virtue of the corner cubes 4 and 8.

A second embodiment of the present invention is now described with reference to FIGS. 7 to 10.

A double corner cube member 42 is assembled by four cut plane mirrors in all. A first corner cube 44 is formed by plane mirrors 45, 46 and 47, and a second corner cube 49 is formed by plane mirrors 46, 47 and 48. The plane mirrors 46 and 47, which are common to the first and second corner cubes 44 and 49, are perpendicular to each other. Both the plane mirrors 45 and 48 are perpendicular to the common plane mirrors 46 and 47. A connecting rod 56 is mounted on back surfaces of the two plane mirrors 46 and 47 in a vertical symmetry plane 54 including an edge 50 which is defined by the two common plane mirrors 46 and 47. A rotary bearing 58 is embedded in the connecting rod 56, so that the double corner cube member 42 is rotatable in the symmetry plane 54 (horizontal plane in this embodiment). Thus, the two corner cubes 44 and 49 can be freely rotated about the rotary bearing 58, while maintaining the plane 54 in the same position.

Figure 3:
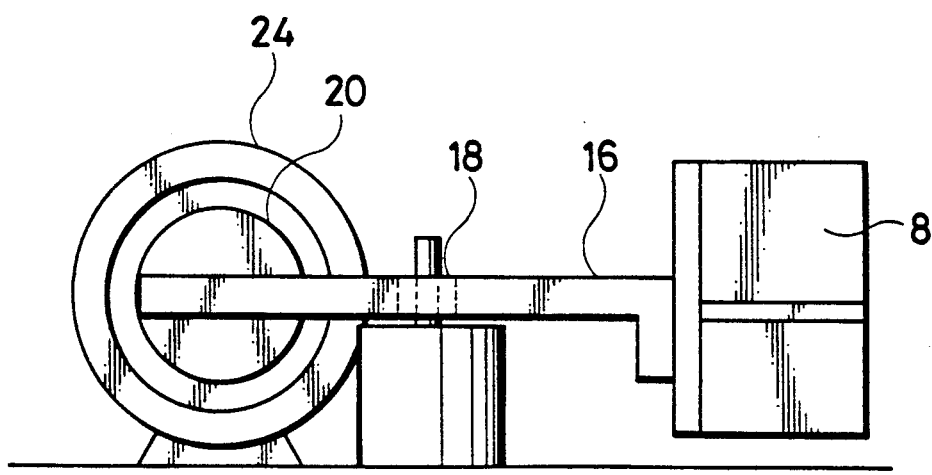
FIG. 3 is a left side elevational view of the part shown in FIG. 2.

The connecting rod 56 is provided on its other end with the same driving mechanism as that shown in FIGS. 2 and 3.

Figure 7:
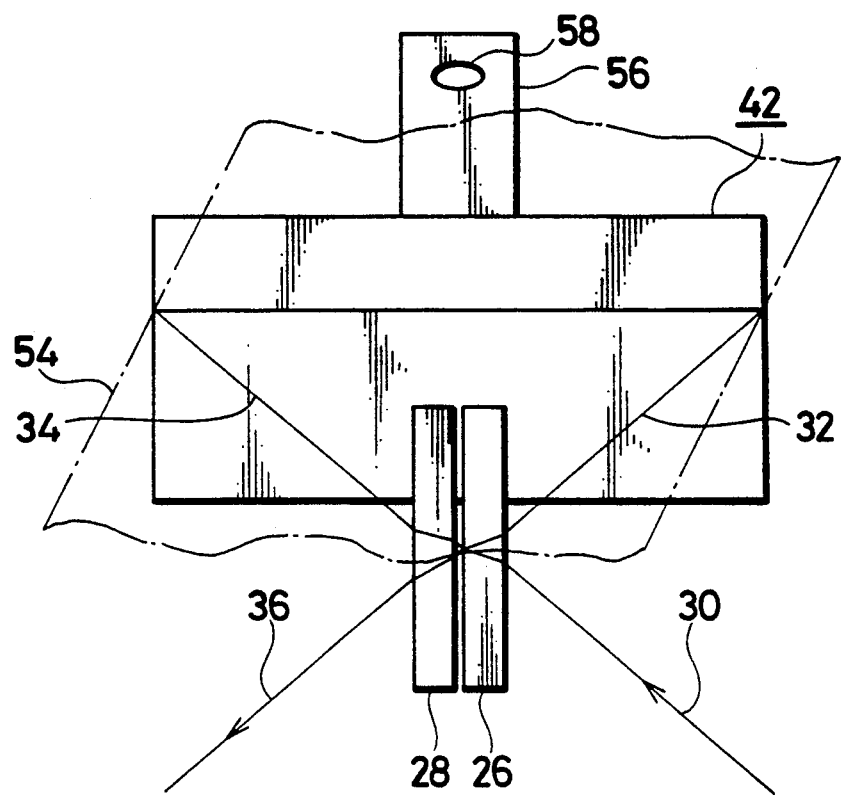
FIG. 7 is a perspective view showing an essential part of a second embodiment.
Figure 8:
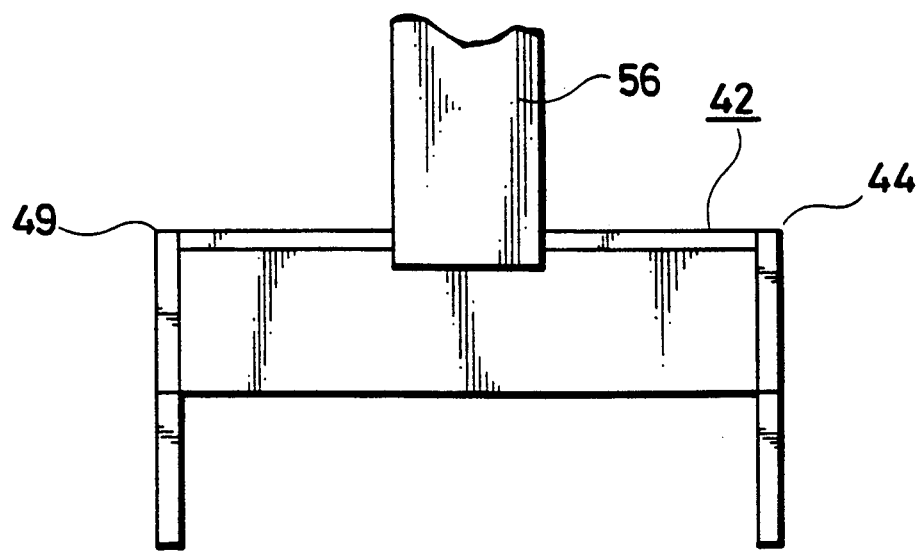
FIG. 8 is a plan view showing a mirror portion of the second embodiment.
Figure 9:
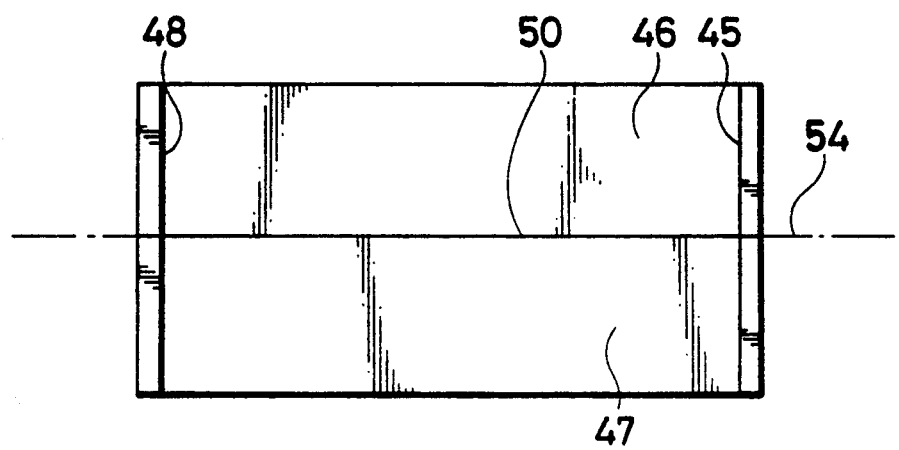
FIG. 9 is a front elevational view of the mirror portion shown in FIG. 8.
Figure 10:
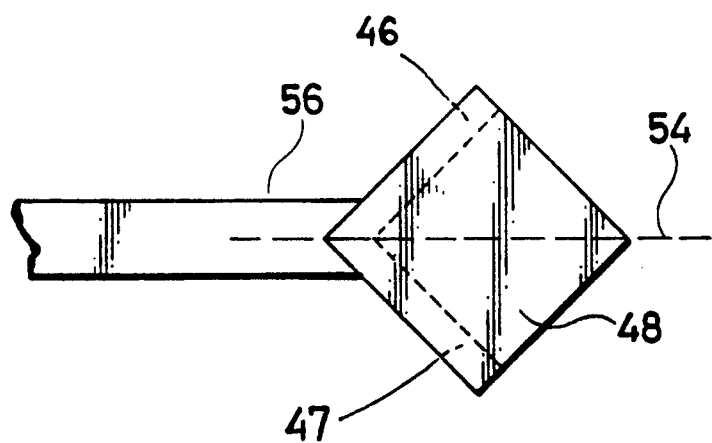
FIG. 10 is a left side elevational view of the mirror portion shown in FIG. 9.

As shown in FIG. 7, a beam splitter 26 and a compensator 28 are provided in front of a central portion of the double corner cube member 42, to form an interferometer.

The operation of the interferometer according to the embodiment shown in FIG. 7 is identical to that of the embodiment shown in FIG. 1.

While the double corner cube member 2 is assembled by five cut plane mirrors in the first embodiment and the double corner cube member 42 is assembled by four cut plane mirrors in the second embodiment, it is also possible to manufacture an integrated double corner cube from the first stage by cutting a single base material. Such a method of cutting a single base material requires no assembling step, and reduces individual difference.

Although the plane including the opposite edges of the two corner cubes or the symmetry plane including the edge defined by the two common mirror surfaces is horizontally arranged in each of the embodiment, such a plane may not necessarily be maintained in the horizontal state but may be arranged along any arbitrary direction such as a vertical direction.

Further, although the connecting rod 16 or 56 is provided in the plane 14 including the opposite edges 10 and 12 or the plane 54 including the edge 50, such a connecting rod 16 or 56 may be provided in a plane which is parallel to the plane 14 or 54.

According to the present invention, two mirror groups are integrally formed by oppositely arranging two corner cubes to share one or two mirror surfaces in common, and reciprocative rotation movement is made in a plane including two opposite edges or a symmetry plane including an edge defined by the two common mirror surfaces, whereby a moving mechanism may simply cause reciprocative rotation movement about one center of rotation, and adjustment in assembling is extremely simple and easy. Thus, the two-beam interferometer can be manufactured at a low cost.

Since the double corner cube member can be formed of the same material, the interferometer is stable against temperature change. Further, the inventive interferometer is also stable against disturbance such as vibration.

When plane mirrors for forming corner cubes are manufactured by machining such as cutting or grinding, it is possible to assemble and work the interferometer in high accuracy.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A Fourier transform spectrophotometer, comprising:
 a common planar mirror;
 two corner cubes each formed of two planar perpendicular mirrors connected together and having a common edge, said planar mirrors of said corner cubes being integrally connected to and extending normal from said common planar mirror, said two corner cubes being positioned obliquely opposite to each other and sharing one mirror surface of said common planar mirror as a common plane, said common edge of each corner cube being normal to said common planar mirror and defining a perpendicular light wave reflecting mirror arrangement with said common planar mirror;

a pivoting support connected to said mirror arrangement defining a mirror assembly;

a drive connected to said mirror assembly for rotating and reciprocating said mirror arrangement in a plane of motion including said common edges of said corner cubes; and a beam splitter positioned adjacent to said mirror assembly for reflecting a part of incident light and guiding the same to one of said corner cubes as well as transmitting the remaining part of said incident light and guiding the same to the other one of said corner cubes while causing interference between light components reflected from said corner cubes.

2. A Fourier transform spectrophotometer in accordance with claim 1, wherein said two corner cubes are formed by assembling cut plane mirrors manufactured by machining.

3. A Fourier transform spectrophotometer in accordance with claim 2, wherein an error of an angle formed between adjacent surfaces from the right angle is within five seconds in each said corner cube.

4. A Fourier transform spectrophotometer in accordance with claim 1, wherein said two corner cubes are manufactured in the form of an integrated corner cube member from the first stage by cutting a single base material.

5. A Fourier transform spectrophotometer in accordance with claim 1, wherein an end of a connecting rod is mounted on a back surface of said common mirror surface in the plane including opposite edges of said two corner cubes or a plane which is parallel thereto in order to rotatingly drive said two corner cubes, while a driving source is mounted on the other end of said connecting rod and a center of rotation is provided at the central portion of said connecting rod.

6. A Fourier transform spectrophotometer in accordance with claim 5, wherein said beam splitter is defined by a rectangular prism positioned perpendicular to said plane of motion, and positioned perpendicular to said common mirror and parallel to said reflectors when in a rest position.

7. A Fourier transform spectrophotometer, comprising:

a common mirror defined by two perpendicular planar mirrors having a common edge;

two corner cubes each defined by a planar mirror integrally connected to and extending perpendicular from said common mirror, said planar mirrors of said corner cubes facing each other and sharing two mirror surfaces of said two perpendicular planar mirrors of said common mirror as common planes and defining a perpendicular light wave reflecting mirror arrangement with said common edge of said planar mirror;

a pivoting support connected to said mirror arrangement defining a mirror assembly;

a drive connected to said mirror assembly for rotating and reciprocating said mirror arrangement in a plane of motion including said common edge of said common mirror; and a beam splitter positioned adjacent to said mirror assembly for reflecting a part of incident light and guiding the same to one of said corner cubes as well as transmitting the remaining part of said incident light and guiding the same to the other of said corner cubes while causing interference between light components reflected from said corner cubes.

8. A Fourier transform spectrophotometer in accordance with claim 7, wherein said two corner cubes are formed by assembling cut plane mirrors manufactured by machining.

9. A Fourier transform spectrophotometer in accordance with claim 7, wherein an error of an angle formed between adjacent surfaces from the right angle is within five seconds in each said corner cube.

10. A Fourier transform spectrophotometer in accordance with claim 7, wherein said two corner cubes are manufactured in the form of an integrated corner cube member from the first stage by cutting a single base material.

11. A Fourier-transform spectrophotometer in accordance with claim 7, wherein an end of a connecting rod is mounted on back surfaces of said common mirror surfaces in the symmetry plane including the edge defined by the common two mirror surfaces or a plane which is parallel thereto in order to rotatingly drive said two corner cubes, while a driving source is mounted on the other end of said connecting rod and a center of rotation is provided at the central portion of said connecting rod.

12. A Fourier transform spectrophotometer in accordance with claim 7, wherein said beam splitter is defined by a rectangular prism positioned perpendicular to said plane of motion, and positioned perpendicular to said common mirror and parallel to said reflectors when in a rest position.

13. A Fourier transform spectrophotometer, comprising:

a common planar mirror supported for movement in a plane of motion;

a pair of reflectors extending perpendicular relative to said common planar mirror and positioned facing each other, said reflectors sharing said common planar mirror for defining a perpendicular light reflecting arrangement, said reflectors defined by a pair of corner cubes having portions extending normal from said common planar mirror and positioned facing each other, each said corner cube defined by a pair of planar mirrors set perpendicular to each other with a common edge and extending normal from said common planar mirror, said planar mirrors of said corner cubes located above the plane of motion are positioned obliquely opposite to each other, said planar mirrors of said corner cubes located below the plane of motion are positioned obliquely opposite to each other, said corner cubes sharing said common planar mirror and defining said perpendicular light reflecting arrangement;

a pivoting support for mounting said light reflecting arrangement for rotary reciprocating movement above a pivot in the plane of motion;

a drive for moving and reciprocating said pivoting support and said light reflecting arrangement about said pivot; and a beam splitter for directing light to said light reflecting arrangement.

14. A spectrophotometer according to claim 13, wherein said beam splitter is fixed in the plane of motion.

15. A spectrophotometer according to claim 14, wherein said beam splitter is defined by a rectangular prism positioned perpendicular to said plane of motion, and positioned perpendicular to said common planar mirror between said reflectors when in a rest position.

16. A spectrophotometer according to claim 15, including a rectangular prism compensator positioned adjacent to said beam splitter.

17. A spectrophotometer according to claim 13, wherein said corner cubes are positioned at opposite ends of said common planar mirror.

18. A mirror for a Fourier transform spectrophotometer, as recited in claim 13.

19. A spectrophotometer according to claim 13, wherein said planar mirrors of said corner cubes located above the plane of motion are positioned parallel with said planar mirrors of said corner cubes located diagonally, respectfully, and below the plane of motion.

20. A spectrophotometer according to claim 13, wherein said common planar mirror includes opposite ends each having a pair of perpendicular edges defining a pair of perpendicular common edges with said planar mirrors of each corner cube.

21. A spectrophotometer according to claim 13, wherein said pivoting support extends normal from a rear of said common planar mirror.

22. A spectrophotometer according to claim 21 wherein said pivoting support is centered between said corner cubes.

23. A Fourier transform spectrophotometer, comprising:
a common mirror supported for movement in a plane of motion, said common mirror defined by a pair of perpendicular planar mirrors having a common edge;
a pair of reflectors extending perpendicular relative to said common mirror and positioned facing each other, said reflectors sharing said common mirror for defining a perpendicular light reflecting arrangement, said reflectors defined by a pair of planar mirrors extending perpendicular relative to said common mirror and positioned facing each other defining corner cubes, said planar mirrors of said reflectors sharing said common mirror and defining said perpendicular light reflecting arrangement;
a pivoting support for mounting said light reflecting arrangement for rotary reciprocating movement about a pivot in the plane of motion;
a drive for moving and reciprocating said pivoting support and said light reflecting arrangement about said pivot; and
a beam splitter for directing light to said light reflecting arrangement.

24. A spectrophotometer according to claim 23, wherein each planar mirror of each reflector includes a pair of perpendicular edges connected to said common mirror defining a pair of perpendicular common edges with said common mirror of each corner cube.

25. A spectrophotometer according to claim 24, wherein said planar mirrors of said reflectors are square.

26. A spectrophotometer according to claim 23, wherein said pivoting support extends from the rear of said common mirror, and set at a 45° angle relative to said planar mirrors of said common mirror.

27. A spectrophotometer according to claim 26, wherein said pivoting support is centered between said corner cubes.

28. A mirror for a Fourier transform spectrophotometer, as recited in claim 23.

* * * * *